Inventor
Ernest F. Gaudet
Leo A. Gaudet

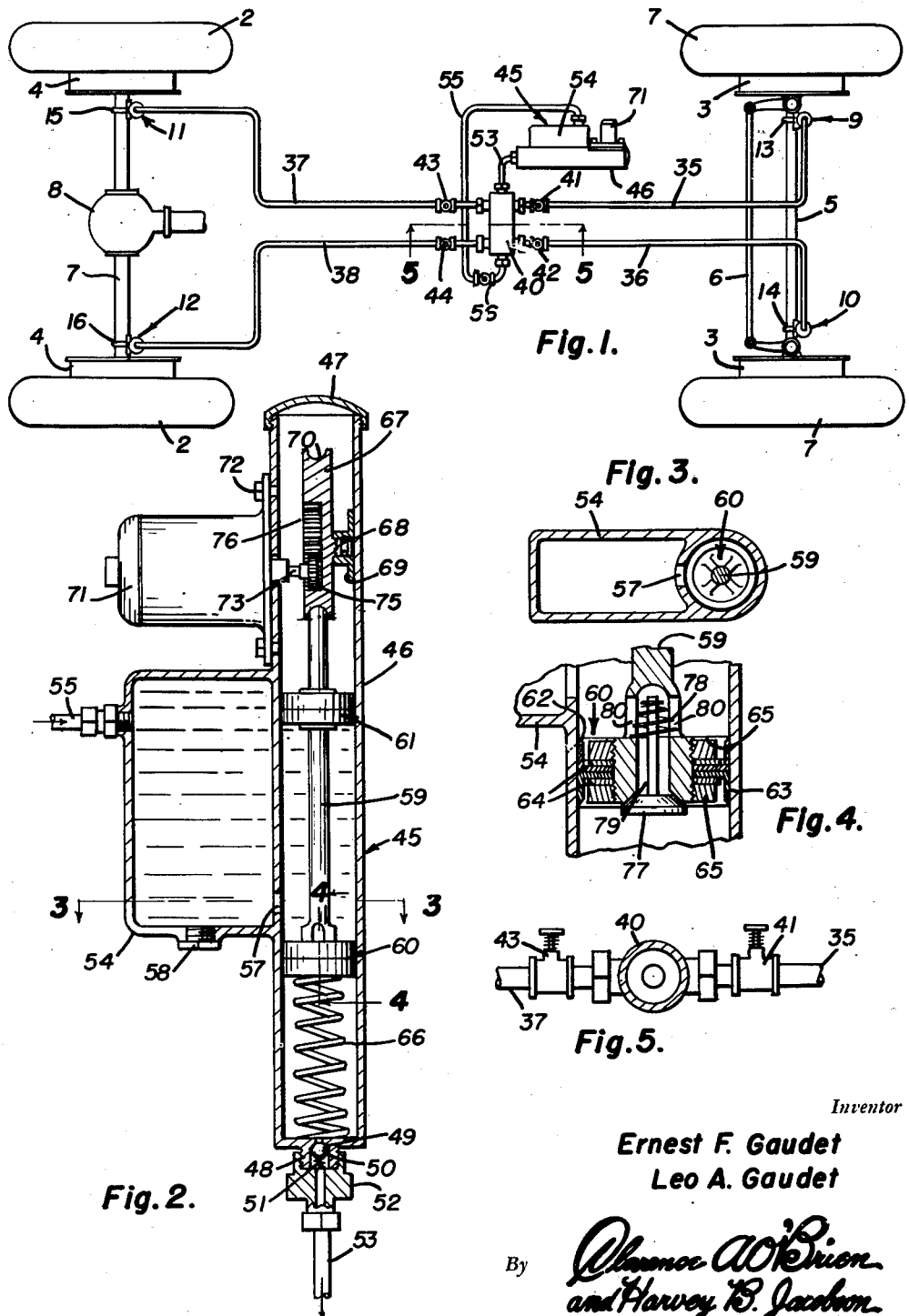

Patented June 17, 1952

2,600,750

UNITED STATES PATENT OFFICE 2,600,750

AUTOMOBILE JACK

Ernest F. Gaudet, Hebronville, and Leo A. Gaudet, South Attleboro, Mass.

Application January 9, 1947, Serial No. 721,036

2 Claims. (Cl. 103—178)

Our invention relates to improvements in automobile jacks, the primary object in view being to provide a jacking equipment of simple form and inexpensive construction for jacking up any or all wheels of an automobile, and which is especially adapted for installation on low built automobiles without necessitating change in the basic structure of the automobile, is inexpensive to operate and service, and will not slip and cause consequent damage, nor readily get out of order.

Other and subordinate objects, also comprehended by our invention, together with the precise nature of our improvements, and the advantages thereof, will be readily understood when the succeeding description and claims are read with reference to the drawings accompanying and forming a part of this specification.

In said drawings:

Figure 1 is a view in plan illustrating our invention in a preferred embodiment thereof applied;

Figure 2 is a view in horizontal section of the pump drawn to a larger scale and with parts as shown in elevation;

Figure 3 is a view in transverse section taken on the line 3—3 of Figure 2;

Figure 4 is a fragmentary view in longitudinal section taken on the line 4—4 of Figure 2 and drawn to a still larger scale;

Figure 5 is a detail view in transverse section taken on the line 5—5 of Figure 1 and drawn to a larger scale;

Figures 6, 7:
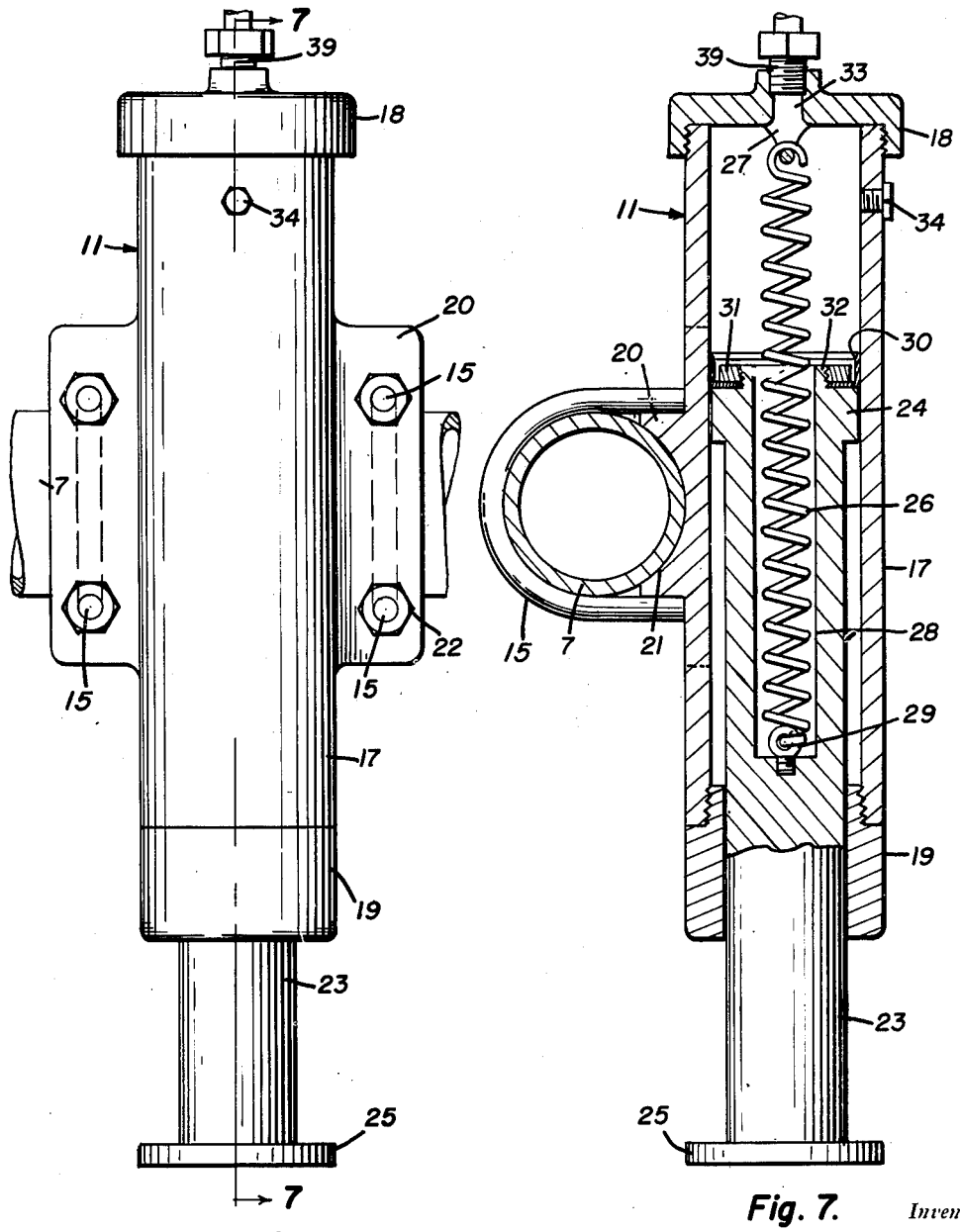
Figure 6 is a view in side elevation of one of the jacks drawn to a larger scale; and, Figure 7 is a view in longitudinal section taken on the line 7—7 of Figure 6.

Referring to the drawings by numerals, our invention has been shown therein as forming part of the equipment of an automobile, the running gear, only, of which has been shown, as sufficient to a proper understanding of the invention, the numeral 1 designating the front steering wheels, 2 the rear traction wheels, 3 the front brake drums, 4 the rear brake drums, 5 the front axle bar, 6 the steering gear, and 7, 8 the rear axle and differential housings respectively.

According to our invention, a pair of front wheel jacks 9 and 10, and a pair of rear wheel jacks 11, 12 are provided which, in the case of the front wheel jacks 9, 10 may be secured in upright position to the front axle bar 5 adjacent the front brake drums 4 by U-bolts 13, 14, and in the case of the rear wheel jacks 11, 12, may be similarly secured to the rear axle housing 7 in a similar manner by U-bolts 15, 16. The jacks 9, 10, 11, 12 are each a counter-part of the others, and therefore a description of one will suffice for all.

Describing now, for example, the rear wheel jack 11, as shown in Figures 6 and 7, said jack comprises a cylindrical casing 17 having an upper end closure cap 18 threaded thereon, and a lower end cylindrical bushing 19 threaded part way into the same. A flange forming plate 20 is provided on one side of the casing 17, intermediate its ends, with a transverse seat 21 seating, in the case of the jack shown, the rear axle housing 7, said flange being clamped to said housing by the U-bolts 15 and nuts 22 on said bolts to secure said casing 17 to said housing in upright position. As will be understood, the front wheel jacks 9, 10 are similarly secured to the front axle bar 5, as shown. A plunger type jack leg 23 is slidably fitted in the bushing 19 with an enlarged upper end head 24 similarly fitted in the casing 17 and an enlarged lower end foot 25 thereon for engaging the ground. A leg retracting coil spring 26 extends from a lug 27 on the closure cap 18 into an axial bore 28 in the leg 23 and to an eye-bolt 29 in the bottom of said bore. A suitable, annular gasket 30 is provided in the upper end of said leg 23 and is clamped thereto by a nut 31 threaded onto a reduced extension 32 of said leg. An axial port 33 is formed in the closure cap 18, and a vent plug 34 is threaded into the upper end portion of said casing 17, all for a purpose presently seen.

A pair of pipe lines 35, 36 extend from the front wheel jacks 9, 10, and a similar pair of pipe lines 37, 38 from the rear wheel jacks 11, 12, each pipe line being connected to the port 33 in the closure cap 18 of the jack by a coupling, as shown at 39 in Figure 7. These pipe lines 35, 36, 37, 38 are suitably connected in pairs to opposite sides of a pressure distributing cylinder 40 which may be suitably mounted in any desired location on the automobile. Control valves 41, 42, 43, 44 are interposed in the pipe lines 35, 36, 37, 38 and which are preferably of the spring closed push-button type and are grouped together in any suitable location on the automobile for easy reach from the driver's seat, not shown.

An hydraulic pump, designated as a unit by the numeral 45, and best shown in Figures 2, 3 and 4 is provided adjacent to the distributor cylinder 40 for forcing oil, or the like, under pressure into the jacks 9, 10, 11, 12 by way of the distributor cylinder 40 and pipe lines 35, 36, 37, 38. The pump 45 may be mounted in any desired manner on the automobile and will now be described in detail.

The hydraulic pump 45 comprises a horizontally disposed barrel 46 having a rear end closure cap 47 and a front end discharge nipple 48 forming a valve seat 49 for an inwardly closing ball valve 50 back by a coil spring 51. A coupling 52 threaded onto the nipple 48 seats the coil spring 51 and connects said nipple to a pressure feed pipe line 53 suitably attached to one end of the distributor cylinder 40.

An oil supply tank 54 on one side of the barrel 46 is suitably connected by a pressure return pipe line 55, with a shut-off valve 56 therein, to the other end of the distributor cylinder 40. A port 57 in one side of the barrel 46 establishes communication between said supply tank 54 and said barrel 46. The port 57 is suitably spaced from the front end of the said barrel 46 for a purpose presently seen. A drain plug is provided in said supply tank 46, as at 58.

A plunger rod 59 in the barrel 46 is provided with a pair of front and rear end pistons 60, 61 thereon of the usual type, shown in Figure 4, comprising opposed cup members 62, 63 clamped together between washers 64 by opposed nuts 65 on said plunger rod 59. The front piston 60 is designed to reciprocate in front of the port 57 and the rear piston 61 in the rear of said port. A coil spring 66 in the barrel 46 interposed between the front end of said barrel and the front piston 60 urges said piston and the plunger rod 59 and the rear piston 61 rearwardly in the barrel 46.

A driven wheel 67 is rotatably mounted eccentrically in the barrel 46 by a stud 68 and a bearing 69 and is provided with a circumferential groove 70 adapted to revolve against the rear end of the plunger rod 59 to thrust said plunger rod 59 forwardly.

A suitable electric motor 71 bolted to the barrel 46, as at 72, with its armature shaft 73 extended into said barrel 46, through an aperture 74 in said barrel, is operatively connected to the wheel 67 by a gear pinion 75 fast on said shaft 73 and meshing with an internal gear 76 in the wheel 67 concentric to the axis of rotation of said wheel. The motor 71 is of a type adapted for operation by the usual automobile ignition battery, not shown, and through suitable controls which may be provided for starting and stopping the motor.

A rearwardly seating valve 77 in the front end of the plunger rod 59 is biased by a coil spring 78 to close an axial port 79 in said end of said rod, said port communicating with side ports 80 in said rod located directly in the rear of the front piston 60 and opening into the barrel 46 forwardly of the port 57.

The manner in which the described invention is used and operated will be readily understood. The motor 71 through the gear pinion 75 and internal gear 76 revolves the grooved wheel 67 to thrust the plunger rod 59 forwardly, in opposition to the spring 66, which returns said rod under control of said wheel. Oil being free to enter the barrel 46, between the pistons 60, 61, such oil, when the valve 56 is closed, is forced in front of the front piston 60 as the plunger rod 59 is returned by the spring 66, to be forced, when said rod 59 is thrust forwardly, past the valve 50 and through the feed pipe 53 into the distributor cylinder 40 to be distributed under pressure through the pipe lines 35, 36, 37, 38 to the jacks 9, 10, 11, 12 under control of the valves 41, 42, 43, 44. Obviously, any or all of said valves 41, 42, 43, 44 may be opened depending upon requirements as to jacking up the wheels 1, 2. By opening the valve 56, the oil from any or all of said jacks is permitted to return under pressure in the jack caused by the load thereon, the oil returning through the distributor cylinder 40 to the supply tank 54. As will be clear, each jack 9, 10, 11, 12 is adapted to be collapsed by the weight of the load thereon, and also by means of the spring 26 if no load is imposed on the jacks.

Any of the well-known types of valves for bleeding hydraulic systems may be utilized in the instant invention, but such valves being understood in the art it has not been deemed necessary to illustrate the same.

The foregoing will, it is believed, suffice to impart a clear understanding of our invention, without further explanation.

Manifestly, our invention, as described, is susceptible of modifications without departing from the inventive concept, and right is herein reserved to such modifications as fall within the scope of the appended claims.

What we claim is:

1. In a hydraulic jacking system, a pump including a cylinder, a plunger rod in said cylinder with a piston thereon having a forward compression stroke and being spring tensioned for a return idle stroke, a liquid supply tank attached to one side of said cylinder with an inlet to said cylinder on one side of the piston, a valve in said piston for passing liquid therethrough from said side of the piston to the other side thereof for discharge out of said cylinder by the compression stroke of said piston, valved discharge means on said cylinder on said other side of said piston, and means to drive said rod forwardly including a motor attached to said cylinder, a driving gear in said cylinder driven by said motor, an eccentric in said cylinder coplanar with said rod and having a peripheral groove engaging one end of said rod, and an internal gear in said eccentric driven by said driving gear to revolve said eccentric.

2. In a hydraulic jacking system, a pump according to claim 1 wherein a second piston is provided on said rod behind the piston first named for confining liquid passing through said valve between said pistons.

ERNEST F. GAUDET.
LEO A. GAUDET.

REFERENCES CITED

The following references are of record in the file of this patent:

UNITED STATES PATENTS

| Number | Name | Date |
| --- | --- | --- |
| 1,545,038 | Davis | July 7, 1925 |
| 1,781,803 | Bizzarri | Nov. 18, 1930 |
| 1,893,464 | Barks | Jan. 3, 1933 |
| 1,911,503 | Hazard | May 30, 1933 |
| 1,998,289 | Romano | Apr. 16, 1935 |
| 2,056,954 | Bryant | Oct. 13, 1936 |
| 2,145,847 | Carpenter | Feb. 7, 1939 |
| 2,407,859 | Wilson | Sept. 17, 1946 |
| 2,423,701 | Hardy | July 8, 1947 |